US007996854B2

(12) United States Patent
Furuichi et al.

(10) Patent No.: US 7,996,854 B2
(45) Date of Patent: Aug. 9, 2011

(54) INFORMATION PROCESSING APPARATUS, METHOD, AND PROGRAM FOR CONTROLLING RESOURCE ACCESS BY APPLICATION PROGRAM

(75) Inventors: Sanehiro Furuichi, Tokyo (JP); Akihiro Ogura, Kanagawa-ken (JP); Satoko Tonegawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/954,144

(22) Filed: Dec. 11, 2007

(65) Prior Publication Data
US 2008/0163242 A1    Jul. 3, 2008

(30) Foreign Application Priority Data

Dec. 27, 2006  (JP) ................................. 2006-351606

(51) Int. Cl.
*G06F 13/00* (2006.01)
(52) U.S. Cl. ........................................ 719/328; 718/104
(58) Field of Classification Search .................. 719/328; 718/104
See application file for complete search history.

(56) References Cited

U.S. PATENT DOCUMENTS

| 7,568,226 | B2* | 7/2009 | Eade et al. | 726/21 |
| 7,644,414 | B2* | 1/2010 | Smith et al. | 719/328 |
| 2009/0221266 | A1* | 9/2009 | Ohta et al. | 455/411 |

FOREIGN PATENT DOCUMENTS

| JP | 2003044297 | 2/2003 |
| JP | 2003-316650 | 11/2003 |
| JP | 2005-235056 | 9/2005 |
| JP | 2006-092560 | 4/2006 |
| JP | 2006-340320 | 12/2006 |
| WO | WO03/085528 A1 | 10/2003 |

OTHER PUBLICATIONS

Application No. 200710192736.3 Filing Date: Nov. 16, 2007 Akihiro Ogura, et al.—"The Configuration Method of Secured Environment Using Removable Device" First Office Action Dated May 8, 2009.
Application No. 2006-351606 Filing Date: Dec. 27, 2006 Sanehiro Furuichi, et al.—"Information Processing Apparatus, Method, and Program for Controlling Resource Access by Application Program" Information Materials for IDS.

* cited by examiner

*Primary Examiner* — Andy Ho
(74) *Attorney, Agent, or Firm* — Wenjie Li

(57) ABSTRACT

A method executed in an information processing apparatus for controlling resource access by an application program running on the information processing apparatus is provided. A change in connection statuses or operating statuses of a device connected to the information processing apparatus is first detected. In response to the detection, a resource access condition to be applied to the information processing apparatus is selected based on certain criterion. The selected resource access condition is stored in a condition storage unit. Then, in response to capture of a function call for resource access issued to an operating system by the application program, the resource access condition is read from the condition storage unit, and it is determined on the basis of the resource access condition whether the captured function call is allowed. If it is determined that the captured function call is not allowed, the function call is rejected.

10 Claims, 7 Drawing Sheets

FIG. 3 a)

| BIT | DEVICE |
|---|---|
| 7th BIT | EXTERNAL MEDIUM #3 |
| 6th BIT | EXTERNAL MEDIUM #2 |
| 5th BIT | EXTERNAL MEDIUM #1 |
| 4th BIT | EXTERNAL DISPLAY |
| 2nd AND 3th BITS | WIRELESS NETWORK DEVICE |
| 0th AND 1st BITS | WIRED NETWORK DEVICE | b)

| WIRED/WIRELESS NETWORK DEVICE | | |
|---|---|---|
| VALUE | | MEANING |
| 1 | 0 | INTERNAL |
| 0 | 1 | EXTERNAL |
| 0 | 0 | NOT USED | c)

| OTHER DEVICES | |
|---|---|
| VALUE | MEANING |
| 0 | NOT CONNECTED |
| 1 | CONNECTED |

FIG. 4

| | CONDITION 1 | CONDITION 2 | CONDITION 3 | CONDITION 4 | ... | CONDITION 71 | CONDITION 72 |
|---|---|---|---|---|---|---|---|
| WIRED NETWORK DEVICE | INTERNAL | EXTERNAL | NOT USED | INTERNAL | ... | EXTERNAL | NOT USED |
| WIRELESS NETWORK DEVICE | NOT USED | NOT USED | NOT USED | INTERNAL | ... | EXTERNAL | EXTERNAL |
| EXTERNAL DISPLAY | NOT CONNECTED | NOT CONNECTED | NOT CONNECTED | NOT CONNECTED | ... | CONNECTED | CONNECTED |
| EXTERNAL MEDIUM #1 | NOT CONNECTED | NOT CONNECTED | NOT CONNECTED | NOT CONNECTED | ... | CONNECTED | CONNECTED |
| EXTERNAL MEDIUM #2 | NOT CONNECTED | NOT CONNECTED | NOT CONNECTED | NOT CONNECTED | ... | CONNECTED | CONNECTED |

FIG. 5

| RESOURCE ACCESS CONDITION 1 (INTERNAL WIRED CONNECTION) | ALL TYPES OF FUNCTION CALL FOR DATA ACCESS ARE ALLOWED. |
|---|---|
| . . . | . . . |
| RESOURCE ACCESS CONDITION 6 (INTERNAL WIRELESS CONNECTION) | FOR PREDETERMINED DATA, FUNCTION CALLS TO COPY, DELETE, AND MOVE DATA, READ DATA INTO SHARED MEMORY, PRINT DATA, AND ACTIVATE PROCESS ARE PROHIBITED. |
| . . . | . . . |
| RESOURCE ACCESS CONDITION 9 (EXTERNAL WIRELESS CONNECTION) | FOR PREDETERMINED DATA, ALL TYPES OF FUNCTION CALL FOR DATA ACCESS ARE PROHIBITED. |
| . . . | . . . |
| RESOURCE ACCESS CONDITION 12 (EXTERNAL DISPLAY CONNECTION) | FOR PREDETERMINED DATA, FUNCTION CALL TO BROWSE DATA IS PROHIBITED. |
| . . . | . . . |
| RESOURCE ACCESS CONDITION 19 (EXTERNAL MEDIUM #1 CONNECTION + INTERNAL PRIORITY CONNECTION) | FUNCTION CALLS TO COPY, CREATE, AND MOVE DATA AND READ DATA INTO SHARED MEMORY, USING EXTERNAL MEDIUM #1 AS STORAGE PLACE, ARE PROHIBITED, AND/ OR, FOR DATA IN EXTERNAL MEDIUM #1, FUNCTION CALLS TO COPY AND MOVE DATA AND READ DATA INTO SHARED MEMORY ARE PROHIBITED. |
| . . . | . . . |
| RESOURCE ACCESS CONDITION 21 (EXTERNAL MEDIUM #1 CONNECTION) | ALL TYPES OF FUNCTION CALL FOR DATA ACCESS ARE ALLOWED. |
| . . . | . . . |
| RESOURCE ACCESS CONDITION 39 (EXTERNAL MEDIUM #2 CONNECTION) | ONLY SPECIFIC PROGRAMS IN EXTERNAL MEDIUM #2 ARE ALLOWED TO BROWSE FILES IN MEDIUM #2. |
| . . . | . . . |

US 7,996,854 B2

INFORMATION PROCESSING APPARATUS, METHOD, AND PROGRAM FOR CONTROLLING RESOURCE ACCESS BY APPLICATION PROGRAM

CROSS-REFERENCE TO RELATED APPLICATION

This present application claims priority of a Japanese patent application S/N 2006-351606 filed Dec. 27, 2006.

FIELD OF THE INVENTION

The present invention relates to control of resource access by application programs via operating systems, and in particular, relates to a technique for controlling resource access in response to the operating environment or operating status of an information processing apparatus, an application program running on the information processing apparatus.

BACKGROUND OF THE INVENTION

A known technique is proposed in a Japanese Unexamined Patent Application Publication No. 2003-44297, in which, in order to entirely reject export of information by a user who has no access right, in an information processing apparatus, functions, such as printing, movement and copying of a file, saving a file in another name in a flexible disk, and capturing of a screen, are restricted in response to the access right of a user.

In the technique in Patent Application Publication No. 2003-44297, a request to manipulate computer resources, such as a file, a network, a storage unit, a display screen, and an external accessory, managed by an operating system is first captured by a resource management program. The resource management program having captured the request for manipulation determines whether the user has an access right to a computer resource specified in the request for manipulation. Then, as a result of the determination, when the user has an access right, the resource management program passes the request for manipulation to the operating system without change. On the other hand, when the user has no access right, the resource management program rejects the request for manipulation.

However, in the aforementioned technique, access permission to a computer resource is defined in association with a combination of a user and the computer resource. Access permission is statically defined by, for example, an administrator. Thus, in the aforementioned technique, access permission cannot be changed in response to the operating environment or operating status of an information processing apparatus. Access permission cannot be specified in response to the operating environment of an information processing apparatus, for example, environment in which an information processing apparatus is used in a safe place, such as company premises. Moreover, access permission cannot be specified in response to the operating status of an information processing apparatus, for example, status in which a USB memory is connected to an information processing apparatus.

It is an object of the present invention to provide an apparatus, a method, and a program for controlling data access by an application program via an operating system so as to provide solutions to the aforementioned problems.

SUMMARY OF THE INVENTION

The present invention for achieving the aforementioned object is implemented by the following method executed in an information processing apparatus for controlling resource access by an application program running on the information processing apparatus. In this method, a change in connection statuses or operating statuses of a device connected to the information processing apparatus is first detected. In response to detection of the change in the connection statuses or the operating statuses, a resource access condition to be applied to the information processing apparatus is selected, referring to a table in which each of the connection statuses or the operating statuses of the device is in association with a resource access condition that should be applied. The selected resource access condition is stored in a condition storage unit. Then, in response to capture of a function call for resource access issued to an operating system by the application program, the resource access condition is read from the condition storage unit, and it is determined on the basis of the resource access condition whether the captured function call is allowed. If it is determined that the captured function call is not allowed, the function call is rejected.

Resources here represent computer resources managed by an operating system, such as files, a main memory, an external storage unit, and processes. Moreover, the function call for resource access here may be any one of all types of function call for data access to browse, create, delete, copy, and move resources, read resources into a shared memory, print resources, and activate a process.

Preferably, the device may be any one of a network device, an external display, and an external medium. External media here include all media that are recognized as external drives by information processing apparatuses, for example, storage media, such as a USB memory, a CD-ROM, a DVD-ROM, a compact flash card, and an SD card, and peripheral devices, such as an external hard disk drive and a digital camera.

Preferably, the detecting step includes a step of detecting a change in an operating status of a network device. On condition that a wireless network device is ready for use, the selecting step includes a step of selecting a resource access condition that is stricter than a resource access condition for a case where a wired network device is ready for use.

Preferably, the detecting step includes a step of, upon detecting a change in an operating status of a network device, obtaining a type of a network to which the information processing apparatus is connected, the type showing a safety level of the network. On condition that the network device is ready for use and that the type of the connected network does not indicate a secure network, the selecting step includes a step of selecting a resource access condition that is stricter than a resource access condition for a case where the network device is ready for use and the type of the network indicates a secure network.

Preferably, the detecting step includes a step of detecting a change in a connection status of an external display. On condition that the external display is connected, the selecting step includes a step of selecting an access condition for rejecting a function call to browse predetermined data.

Preferably, the detecting step includes a step of detecting a change in a connection status or an operating status of an external medium. On condition that the external medium is connected or ready for use, the selecting step includes a step of selecting a resource access condition for causing a process invoked from the external medium and another process to access resources under different conditions.

Preferably, the detecting step includes a step of, upon detecting that an external medium is connected or ready for use, obtaining hardware identification information of the external medium. On condition that the external medium is connected or ready for use, the selecting step includes a step of selecting a resource access condition to be applied to the information processing apparatus on the basis of the hardware identification information of the external medium. A manufacturer, a model number, a serial number, and the like are used as hardware identification information.

Preferably, the method for controlling resource access further includes a step of, in response to detection of the changes in the connection statuses or the operating statuses of a plurality of devices, storing the detected connection statuses or operating statuses of the plurality of devices in a status storage unit. In the table, each of combinations of connection statuses or operating statuses of the plurality of devices is in association with a resource access condition that should be applied. The selecting step includes a step of reading the current connection statuses or operating statuses of the individual devices from the status storage unit, referring to the table, in which each of combinations of connection statuses or operating statuses of the plurality of devices is in association with a resource access condition that should be applied, and selecting a resource access condition to be applied to the information processing apparatus.

While the present invention has been described as a method, in an information processing apparatus, for controlling resource access via an operating system, the present invention may be regarded as a program product comprising a computer readable medium having computer usable program code embodied therewith for causing an information processing apparatus to execute such a method. Moreover, the present invention may be regarded as an information processing apparatus for controlling data access via an operating system.

According to the present invention, resource access via an operating system can be flexibly rejected or allowed on the basis of the operating environment or operating status of an information processing apparatus.

BRIEF DESCRIPTION OF THE DRAWINGS

FIG. 3a) shows an example of information indicating the current connection statuses or operating statuses of individual devices. FIG. 3b) shows the meaning of two bits assigned to a network device. FIG. 3c) shows the meaning of one bit assigned to a device other than a network device.

FIG. 4 shows an example of a selection table 245.

FIG. 5 shows examples of the details of seventy-two access conditions shown in FIG. 4.

DETAILED DESCRIPTION OF PREFERRED EMBODIMENTS

The preferred embodiment for carrying out the invention will now be described in detail on the basis of the drawings. The following embodiment does not restrict the invention claimed in the claims. Moreover, all combinations of features described in the embodiment are not necessarily mandatory for the problem-solving means of the invention. The same numbers are assigned to the same components throughout the description of the embodiment.

Figure 1:
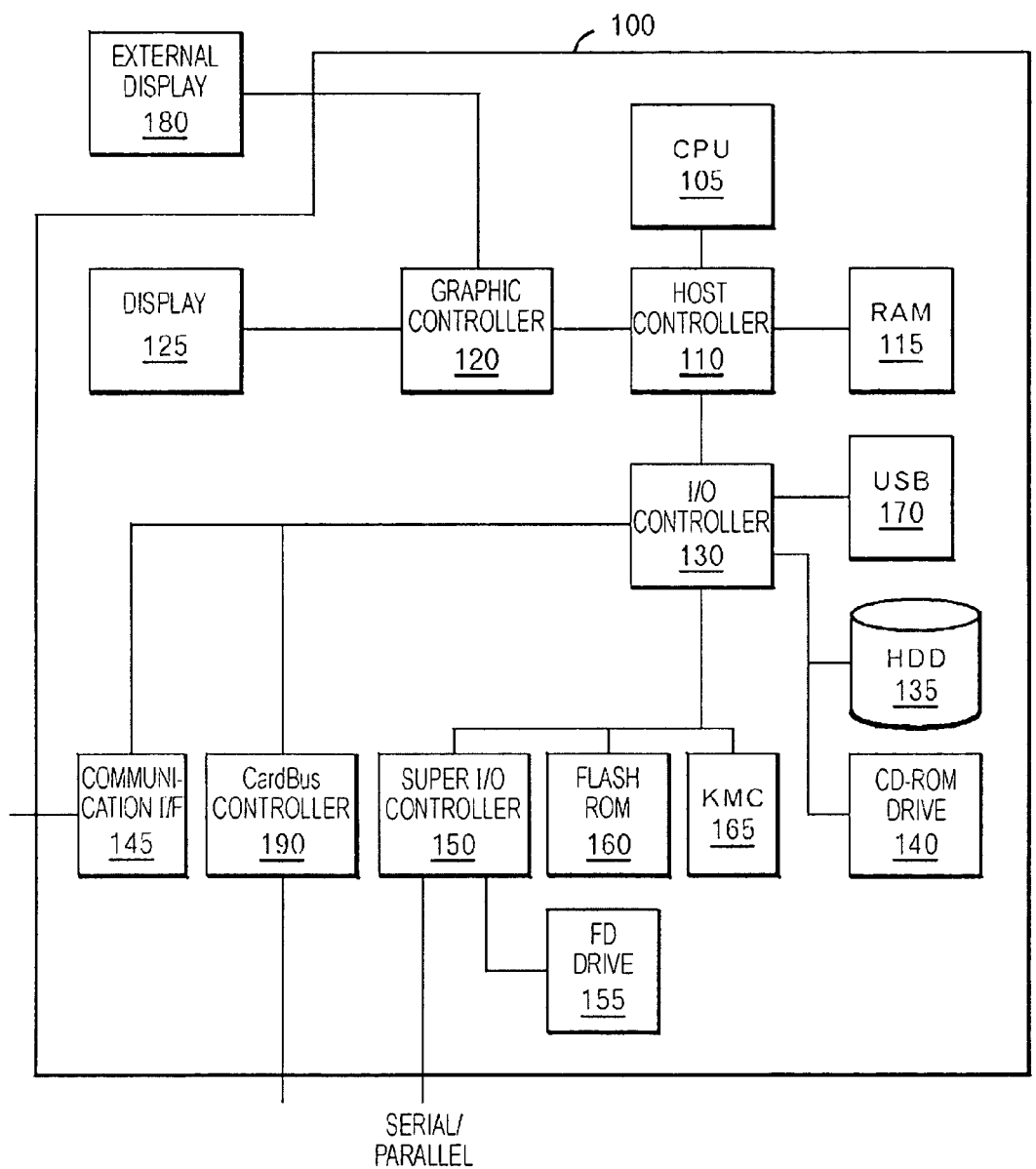
FIG. 1 shows an example of the hardware configuration of an information processing apparatus 100 according to an embodiment of the present invention.

FIG. 1 shows an example of the hardware configuration of an information processing apparatus that can be used in an embodiment of the present invention. An information processing apparatus 100 includes a CPU peripheral section that includes a CPU 105, a RAM 115, and a graphic controller 120 that are connected to each other via a host controller 110, a display 125, and an external display 180, an input-output section that includes a communication interface 145, a hard disk drive 135, and a CD-ROM drive 140 that are connected to the host controller 110 via an input-output controller 130, and a legacy input-output section that includes a super I/O controller 150, a flash ROM 160, and a keyboard-mouse controller 165 that are connected to the input-output controller 130, and a flexible disk drive 155 that is connected to the super I/O controller 150.

The host controller 110 connects to the CPU 105 and the graphic controller 120, which access the RAM 115 at a high transfer rate, to the RAM 115. The CPU 105 operates according to programs stored in the flash ROM 160 and the RAM 115 and controls individual components. The graphic controller 120 obtains image data generated in a frame buffer provided in the RAM 115 by the CPU 105 and the like and displays the image data on the display 125 and/or the external display 180. Instead of this arrangement, the graphic controller 120 may include the frame buffer, which stores image data generated by the CPU 105 and the like.

The input-output controller 130 connects the communication interface 145, the hard disk drive 135, and the CD-ROM drive 140, which are relatively high-speed input-output units, to the host controller 110. The communication interface 145 communicates with external devices via networks. The communication interface 145 is an Ethernet adapter connected to the Ethernet (a registered trademark) or a wireless LAN adapter connected to a network through the air, not a cable. The recent information processing apparatus 100 includes both an Ethernet adapter and a wireless LAN adapter as the communication interface 145. When the information processing apparatus 100 is a notebook computer, the input-output controller 130 further connects a CardBus controller 190 to the host controller 110. The CardBus controller 190 controls a PC card inserted in a PC card slot, and the PC card is used as, for example, a flash memory card, a hard disk, an SCSI card, a LAN card, or a wireless LAN card.

The hard disk drive 135 stores programs and data used by the information processing apparatus 100. The CD-ROM drive 140 reads programs or data from a CD-ROM and supplies the programs or data to the RAM 115 or the hard disk drive 135. Moreover, a USB port is provided in the input-output controller 130. The USB port is connected to a USB connector 170 provided on, for example, a wall surface of the information processing apparatus 100. A removable device, such as a USB memory or a USB external HDD, can be connected to the USB connector 170.

Moreover, the super I/O controller 150, the keyboard-mouse controller 165, and the like, which are relatively low-speed input-output units, and the flash ROM 160 are connected to the input-output controller 130. The flash ROM 160 stores a boot program executed by the CPU 105 when the information processing apparatus 100 is activated, programs that depend on the hardware of the information processing apparatus 100, and the like. The flexible disk drive 155 reads programs or data from a flexible disk and supplies the programs or data to the super I/O controller 150 via the RAM 115. The super I/O controller 150 enables connection of input-output units, for example, a printer, a flexible disk, a keyboard, and a mouse, via a parallel port, a serial port, a keyboard port, a mouse port, and the like.

A program 220 described below according to the present invention for controlling resource access via an operating system is stored in a storage medium, such as a flexible disk, a CD-ROM, or an IC card, and provided by the user. The program is read from the storage medium via the input-output controller 130 and/or the super I/O controller 150, and installed and executed in the information processing apparatus 100.

The program 220 may be stored in an external storage medium. In addition to a flexible disk and a CD-ROM, an optical recording medium such as a DVD or a PD, a magneto-optical recording medium such as an MD, a tape medium, a semiconductor memory such as an IC card, or the like can be used as the storage medium. Moreover, the program may be provided to the information processing apparatus 100 via networks using, as the recording medium, a storage unit, such as a hard disk or a RAM, provided in a server system connected to a private communication network, the Internet, or the like.

Figure 2:
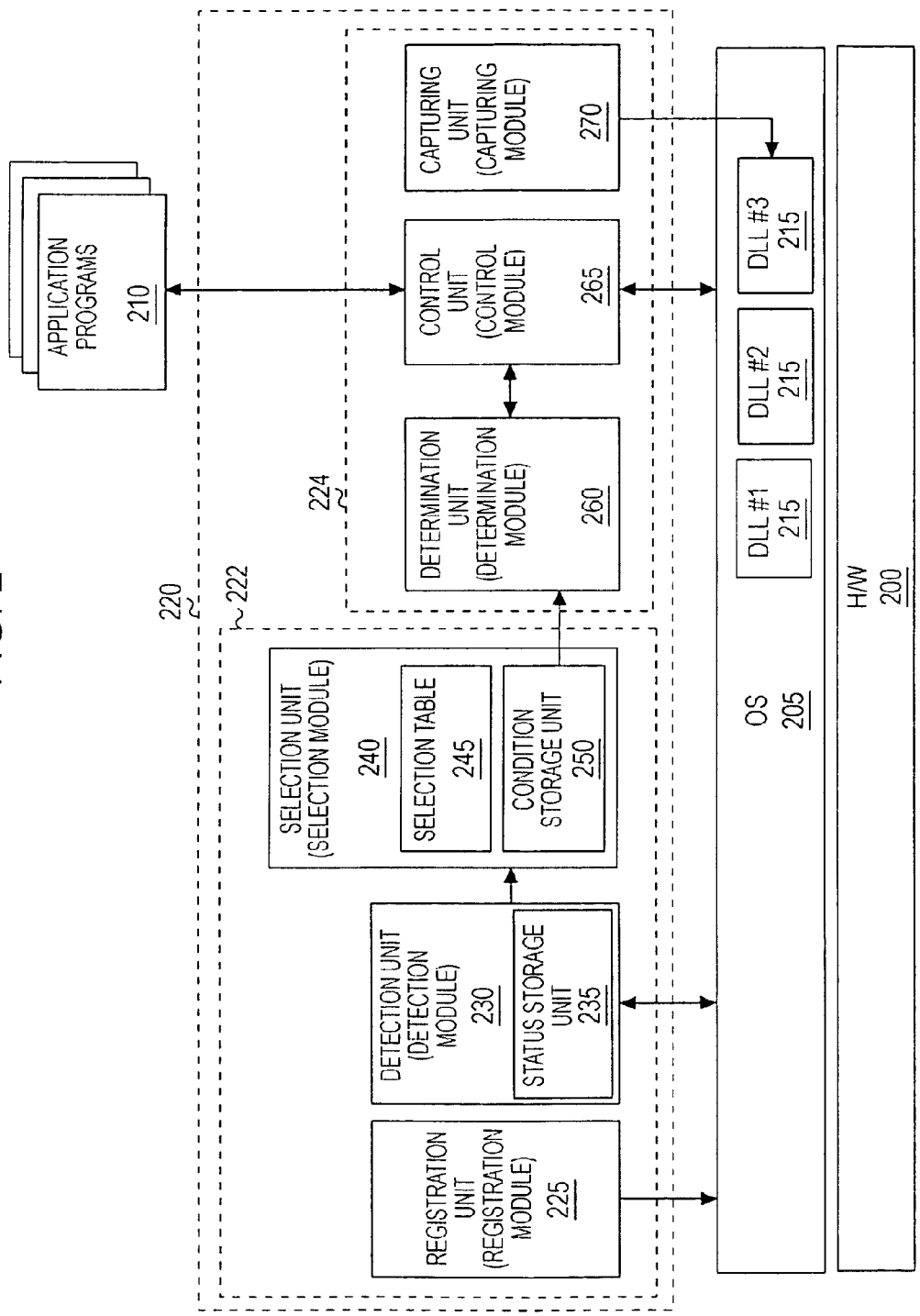
FIG. 2 is a functional block diagram of the information processing apparatus 100, which executes a program 220 according to an embodiment of the present invention for controlling data access via an operating system.

FIG. 2 is a functional block diagram of the information processing apparatus 100, which executes the program 220 according to the present invention for controlling resource access via an operating system. Hardware 200 shown in FIG. 2 is the hardware of the information processing apparatus 100 shown in FIG. 1. The information processing apparatus 100 causes an operating system (hereinafter OS) 205 to operate on the hardware 200. The OS 205 is a versatile OS that executes various types of applications 210, for example, a Windows (a trademark) OS of Microsoft Corporation, an OS/2 (a trademark) OS of IBM Corporation, or a Linux (a registered trademark) OS.

In general, the application programs 210 running on a versatile OS use application program interfaces (hereinafter APIs) provided by the OS 205 when the application programs 210 access resources. For example, when the application programs 210 make a copy of a file, the application programs 210 issue an API function call to make a copy of the file to the OS 205. Similarly, when the application programs 210 move a file from a certain medium to another medium, the application programs 210 issue an API function call to move the file to the OS 205. When the OS 205 is a Windows (a trademark) OS, API functions are provided as dynamic link libraries (hereinafter DLLs) 215. The application programs 210 described in the specification represent all programs running on the OS 205.

Thus, control of resource access by various types of application is implemented by monitoring call of API functions that are preset as objects, processes in the objects being monitored, out of a plurality of API functions provided by the OS 205 and determining whether to permit a detected API function call on the basis of an appropriate resource access condition. It is an object of the information processing apparatus 100 according to the present invention to dynamically determine a resource access condition for determining whether to permit a detected API function call, in view of the operating environment or operating status of the information processing apparatus 100. The operating environment or operating status of the information processing apparatus 100 is estimated from the connection statuses or operating statuses of devices connected to the information processing apparatus 100.

The program 220 for controlling resource access via an operating system includes a resident program 222 that includes a registration module, a detection module, and a selection module, and a program 224 that includes a determination module, a control module, and a capturing module. The modules cause the information processing apparatus 100 to function as a registration unit 225, a detection unit 230, a selection unit 240, a determination unit 260, a control unit 265, and a capturing unit 270.

The registration unit 225 performs registration for receiving notifications about changes in the hardware configuration of devices in the information processing apparatus 100 from the OS 205. In general, the OS 205 provides service for sending notifications about changes in the hardware configuration to specified applications. In this embodiment, device notifications are registered for network devices, external displays, and external media.

For example, in a Windows (a trademark) OS, the Register/Device/Notification function can be used for registration for device notification. In the Register/Device/Notification function, a handle of the service or window that receives device events and a pointer to a data block that specifies a device or a device type for which notifications are received are specified. Moreover, more detailed device event notifications can be registered using the Exec/Notification/Query function of Windows Management Instrumentation (WMI) that is a versatile method for managing device drivers.

The detection unit 230 detects changes in the connection statuses or operating statuses of devices connected to the information processing apparatus 100. When device notifications are registered using the Register/Device/Notification function, the detection unit 230 detects changes in the connection statuses or operating statuses of devices by receiving a WM_DEVICECHANGE message from a Windows (a trademark) OS. A WM_DEVICECHANGE message includes a parameter indicating what event has happened and a pointer to detailed information about the event including information about a device in which the event has happened.

For example, when a device or a medium has been inserted and ready for use, a WM_DEVICECHANGE message in which DBT_DEVICEARRIVAL is set as a parameter is sent. Moreover, when a network has been ready for use, a WM_DEVICECHANGE message in which DBT_DEVNODES_CHANGED is set is sent. A change in the connection status of a cable is detected by separately receiving a notification of a WMI event, as necessary.

Moreover, when the detection unit 230 has detected a change in the operating status of a network device, the detection unit 230 obtains the type of a network to which the information processing apparatus 100 is connected, the type showing the safety level of the network. Network types showing the safety levels include all network types that can be used to determine whether the information processing apparatus 100 is used in a safe environment, for example, an internal network in which a firewall is set up or an external network in which no measure is taken against intrusion of an outsider. For example, the type of a network can be obtained by checking the value of the network portion of an IP address assigned to the information processing apparatus 100 using the ipconfig command. Moreover, when the IP address of a specific device that always exists in a network is known, the type of the connected network can be obtained by issuing the ping command to the specific device. For example, in a case where the specific device is an internal server, when a response to the ping command is obtained, the connected network is an internal network.

Moreover, when the detection unit 230 has detected that an external medium has been connected or ready for use, the detection unit 230 obtains the hardware identification information of the external medium, such as the manufacturer, the model number, and the serial number. Such hardware identification information can be obtained by, for example, sending an I/O control code (DeviceIoControl) to a device driver and obtaining the device descriptor (DeviceDescriptor).

Moreover, the detection unit 230 includes a status storage unit 235 that stores information about the current connection status or operating status of each device and updates the information stored in the status storage unit 235 with the detected connection status or operating status of each device. FIG. 3 shows an example of information stored in the status storage unit 235. In this embodiment, the connection statuses or operating statuses of six types of device are stored using one byte, the six types of device including a wired network device, a wireless network device, an external display, and external media #1 to #3, as shown in of FIG. 3a). Two bits are assigned to each of the network devices, and one bit is assigned to each of the other devices.

FIG. 3b) shows the meaning of two bits assigned to each of the network devices. A value 00 indicates that the corresponding network device is not being used. Values 01 and 10 both indicate that the corresponding network device is being used. The value 01 indicates that the corresponding network device is connected to an internal network, and the value 10 indicates that the corresponding network device is connected to an external network. FIG. 3c) shows the meaning of one bit assigned to each of the other devices. A value 0 indicates that the corresponding device is not connected to the information processing apparatus 100, and a value 1 indicates that the corresponding device is connected to the information processing apparatus 100.

The selection unit 240 selects, in response to detection of changes in the connection statuses or operating statuses by the detection unit 230, a resource access condition that is applied to the information processing apparatus 100 on the basis of the detected connection statuses or operating statuses. More specifically, the selection unit 240 includes a selection table 245 in which each of the combinations of the connection statuses or operating statuses of a plurality of devices is in association with a resource access condition that should be applied to each of the combinations, and selects, referring to the selection table 245, a resource access condition in association with the combination of the current connection statuses or operating statuses of devices read from the status storage unit 235 as a resource access condition to be applied to the information processing apparatus 100. The selection unit 240 further includes a condition storage unit 250 and stores the selected resource access condition in the condition storage unit 250.

FIG. 4 shows an example of the selection table 245 covering five types of device: the wired network device, the wireless network device, the external display, and the external media #1 and #2. Each of the network devices is in one of the following three statuses: connected to an internal network, connected to an external network, and not used, as described with reference to FIG. 2. Each of the other devices is in one of the following two statuses: connected and not connected. Thus, it is found by calculating the product of three (the number of possible statuses of the wired network device), three (the number of possible statuses of the wireless network device), two (the number of possible statuses of the external display), two (the number of possible statuses of the external medium #1), and two (the number of possible statuses of the external medium #2) that seventy-two combinations of the connection statuses or operating statuses of the plurality of devices exist, and each of the combinations is in association with an access condition that should be applied to each of the combinations. The seventy-two access conditions are not necessarily different from each other, and some of the access conditions may overlap each other.

In general, a plurality of types of external medium can be connected to the information processing apparatus 100, and the same resource access condition may be applied to all external media. However, in this embodiment, external media connected to the information processing apparatus 100 are classified, as shown in FIG. 4, and a resource access condition is selected for a specific external medium, the resource access condition being different from that for the other external media. This enables access control in which, for example, a distinction is made between a reliable medium that has a specific model number and is passed out to employees by a company for business use, such as a USB memory having a fingerprint authentication function, and many and unspecified unreliable media.

FIG. 5 shows examples of the details of the seventy-two resource access conditions shown in FIG. 4. A system administrator who administrates the information processing apparatus 100 or a user can appropriately determine and set resource access conditions. A resource access condition 1 is applied to a case where the information processing apparatus 100 is connected to an internal network via the wired network device. Since the information processing apparatus 100 is connected to the internal network with a cable, it can be presumed that the information processing apparatus 100 is used in a safe place where, basically, only employees in the same section can enter, such as employee's individual workspaces in the company. Thus, in the access condition 1, all types of function call for data access to, for example, browse, create, delete, copy, and move data, read data into a shared memory, print data, and activate a process are allowed.

On the other hand, a resource access condition 6 is applied to a case where the information processing apparatus 100 is connected to an internal network via the wireless network device. Since the information processing apparatus 100 is connected to the internal network through the air, it can be presumed that the information processing apparatus 100 is used in a place where, for example, employees in another department and section, and customers and vendors who visit the company can enter, such as a conference room or a cafeteria in the company. Thus, although the information processing apparatus 100 is used in the company, risks including information leakage need to be considered to some extent. Accordingly, in the resource access condition 6, for predetermined data such as confidential information, function calls to copy, delete, and move the data, read the data into a shared memory, print the data, and activate a process are prohibited. In this way, in this embodiment, the resource access condition 6 is stricter than the resource access condition 1. When the wireless network device is ready for use, a resource access condition that is stricter than that for a case where the wired network device is ready for use is applied to the information processing apparatus 100.

A resource access condition 9 is applied to a case where the information processing apparatus 100 is connected to an external network via the wireless network device. Since the information processing apparatus 100 is connected to the external network through the air, it can be presumed that the information processing apparatus 100 is used in a place where many and unspecified people exist, such as an airport or a hotel lobby. Thus, in the resource access condition 9, for predetermined data such as confidential information, all types of function call for data access to, for example, browse, copy, delete, and move the data, read the data into a shared memory, print the data, and activate a process are prohibited. In this way, in this embodiment, the resource access condition 9 is stricter than the resource access condition 6. When the information processing apparatus 100 is connected to an insecure network, a resource access condition that is stricter than that for a case where the information processing apparatus 100 is connected to a secure network is applied to the information processing apparatus 100.

A resource access condition 12 is applied to a case where the external display is connected to the information processing apparatus 100. In many cases, the external display is used for presentation, and the participants can view information that appears on the screen of the information processing apparatus 100 through the external display. Thus, a risk exists in that confidential information may unexpectedly appear on the screen due to a misoperation by a user who operates the information processing apparatus 100, and the content may leak. Thus, in the resource access condition 12, for predetermined data such as confidential information, a function call to browse the data is prohibited. Instead of prohibiting the function call to browse the data, a function call to display the data on the screen may be prohibited.

A resource access condition 19 is applied to a case where the information processing apparatus 100 is connected to an internal network via the wired network device, and the external medium #1 is connected to the information processing apparatus 100. Since the external medium #1 is connected to the information processing apparatus 100, the user can readily store information in the internal network in the external medium #1 and export the information. Thus, in the resource access condition 19, function calls to copy, create, and move data and read data into a shared memory, using the external medium #1 as a storage place, are prohibited.

In the resource access condition 19, since the information processing apparatus 100, to which the external medium #1 is connected, is connected to the internal network, when a file contaminated with a virus is stored in the external medium #1, virus contamination may spread to the internal network. Thus, instead of or in addition to the resource access condition 19, for data in the external medium #1, function calls to copy and move the data and read the data into a shared memory are prohibited.

A resource access condition 21 is applied to a case where the external medium #1 is connected to the information processing apparatus 100. Since the external medium #1 stores files, programs, and the like that need not be handled as confidential, in the resource access condition 21, all types of function call for data access to, for example, browse, create, delete, copy, and move data, read data into a shared memory, print data, and activate a process are allowed. As is evident from the comparison of the resource access conditions 1, 19, and 21, in this embodiment, an applicable resource access condition is provided for each of the combinations of the connection statuses or operating statuses of a plurality of devices.

A resource access condition 39 is applied to a case where the external medium #2 is connected to the information processing apparatus 100. The external medium #2 is a special device for handling confidential business information, the device including, for example, a fingerprint authentication function and an internal VPN access program, and includes confidential data. Thus, in the resource access condition 39, for files in the external medium #2 identified by predetermined hardware identification information, function calls to browse, delete, copy, and move the files are prohibited, and as an exception, only specific programs in the external medium #2 are allowed to browse the files in the medium #2. In this way, in this embodiment, a resource access condition that is different from that for the external medium #1 is applied to the external medium #2.

In this way, the operating environment or operating status of the information processing apparatus 100 is estimated from the connection statuses or operating statuses of devices connected to the information processing apparatus 100, and a resource access condition that should be applied to the estimated operating environment or operating status is determined. The determined resource access condition is stored in not only a shared area accessible from both the resident program 222 and the program 224, for example, a main memory, but also a shared area of a recording medium, for example, a hard disk or a magneto-optical disk.

The capturing unit 270 captures a plurality of function calls for resource access issued to the OS 205 by the application programs 210. More specifically, in response to the start of operation of the application programs 210, the capturing unit 270 captures a plurality of function calls for resource access issued to the OS 205 by the application programs 210 by changing the called addresses of the plurality of function calls for resource access to the address of the control module, which implements the control unit 265. A plurality of function calls for resource access here include all types of function call for resource access to browse, copy, create, delete, and move data, read data into a shared memory, print data, and activate a process. In this embodiment, these functions are provided by the operating system 205 as the DLLs #1 to #3 215.

The determination unit 260 determines, on the basis of a resource access condition read from the condition storage unit 250, whether to allow a captured function call. In a resource access condition, the types of function calls, data, processes, and the like are specified, data processing by the function calls being allowed or not allowed, as described with reference to FIG. 5. Thus, the determination unit 260 determines whether to allow a captured function call by comparing a function called in the captured function call with functions specified in the resource access condition.

When function calls made for predetermined data are prohibited in a resource access condition, the determination unit 260 further determines, by checking the type of data specified by the argument of a captured function call, whether to allow the captured function call. For example, when the type of predetermined data for which function calls are prohibited is confidential data, the determination unit 260 checks whether specific character strings, such as "confidential" or "secret", are included in data specified by the argument of a captured function call, the name of the data, the name of a folder in which the data is stored, and the like.

When function calls made specifying a predetermined data storage place are prohibited in a resource access condition, the determination unit 260 further determines, by checking a data storage place specified by the argument of a captured function call, whether to allow the captured function call. For example, when a predetermined data storage place in which function calls are prohibited is an external medium, the determination unit 260 obtains the attribute of a storage device specified by the argument of a captured function and determines whether the device type is a removable device.

When a specific external medium is specified as a predetermined data storage place, the specific external medium being identified by predetermined hardware identification information, for example, a vendor ID indicating the manufacturer or a product ID, the determination unit 260 further obtains the hardware identification information of the storage device and determines whether the hardware identification information matches a hardware identifier specified in a corresponding resource access condition. When, in a resource access condition, function calls are allowed only for processes that call functions and are invoked from a predetermined place, the determination unit 260 further obtains the type, hardware identification information, and the like of a device in which a program module of a calling process exists, and determines whether these items of information match the resource access condition.

When the application programs 210 have called the control unit 265, the control unit 265 calls and causes the determination unit 260 to determine whether to allow a captured function call. When the determination unit 260 determines not to allow corresponding data processing, the control unit 265 rejects the function call. More specifically, when the determination unit 260 determines not to allow corresponding data processing, the control unit 265 returns an error code to the application programs 210 without calling a function in the DLLs #1 to #3 215. Alternatively, the control unit 265 may merely return null data to the application programs 210. When the determination unit 260 determines to allow corresponding data processing, the control unit 265 specifies an argument specified by the application programs 210 without change and calls a function in the DLLs #1 to #3 215. Alternatively, the control unit 265 may change an argument and call a function in the DLLs #1 to #3 215, or may add different types of function call before and/or after the function call.

In the information processing apparatus 100 according to the present invention, resource access via an OS can be rejected or allowed on the basis of a resource access condition corresponding to the operating environment or operating status of the information processing apparatus 100, as described above.

Figure 6:
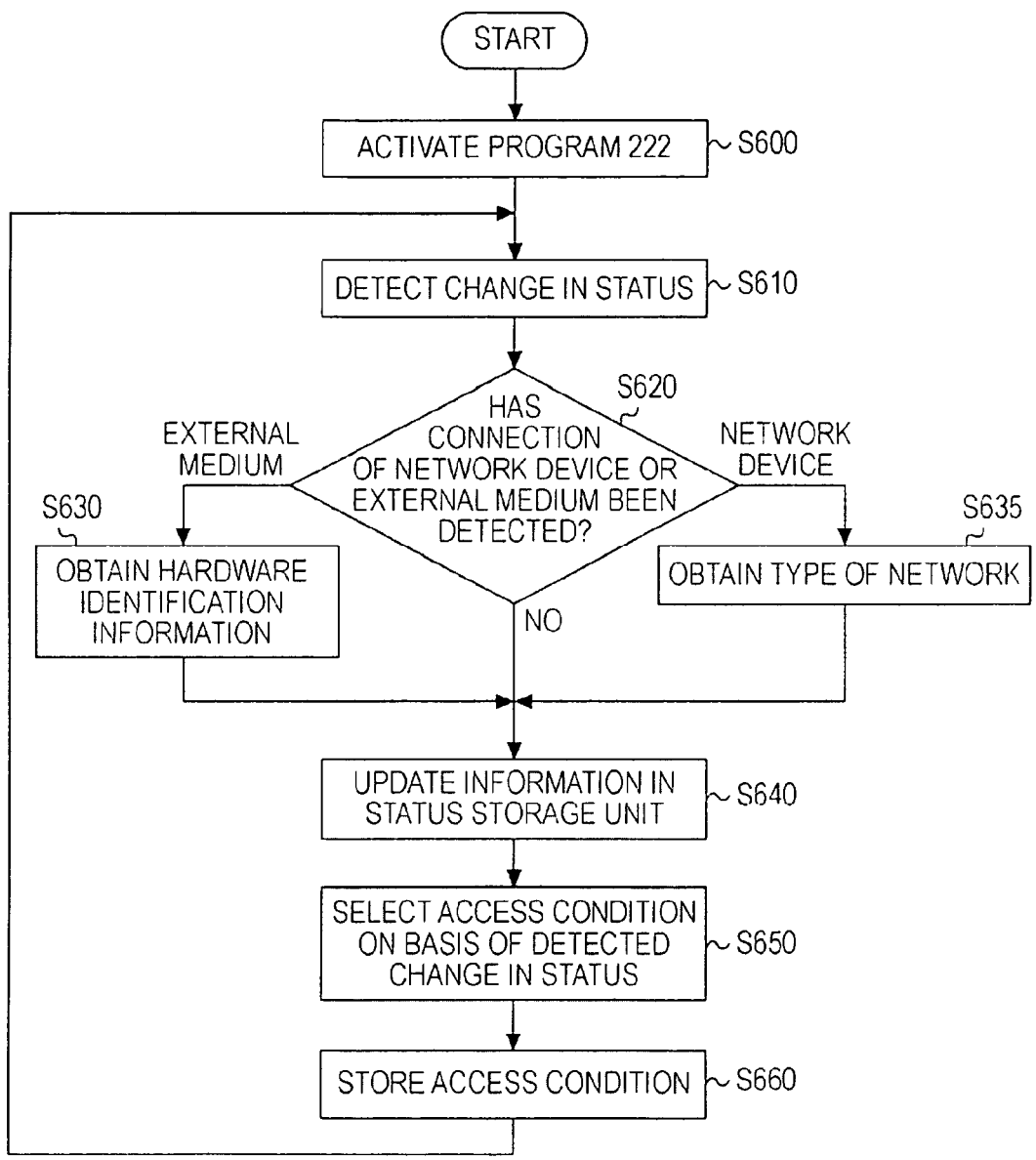
FIG. 6 is a flowchart showing an example of the flow of the process of a resident program 222.

The operations of the individual components of the information processing apparatus 100 according to the present invention will now be described with reference to flowcharts in FIGS. 6 and 7. FIG. 6 shows an example of the flow of a process in the information processing apparatus 100 caused to function as the registration unit 225, the detection unit 230, and the selection unit 240 by the resident program 222. Before the process shown in FIG. 6 is performed, the resident program 222 is executed at least once in the information processing apparatus 100 and causes the information processing apparatus 100 to function as the registration unit 225. Specifically, the information processing apparatus 100 performs, as preprocessing, registration for receiving notifications of changes in the hardware configurations of devices from the OS 205. Then, in step S600, the resident program 222, together with the OS 205, is activated, so that the process is started.

When the resident program 222 has been activated, the detection unit 230 detects a change in the connection status or operating status of a device connected to the information processing apparatus 100 by receiving a notification of the change in the status from the OS 205 (step S610). Then, the detection unit 230 determines whether the detected change in the connection status or operating status is a change of a network device or an external medium (step S620). When the detected change in the connection status or operating status is a change of an external medium, the detection unit 230 obtains the hardware identification information of the external medium (step S630). When the detected change in the connection status or operating status is a change of a network device, the detection unit 230 obtains the type of a network to which the information processing apparatus 100 is connected (step S635).

After step S630 or S635, or in the case of NO in step S620, the process proceeds to step S640 where the detection unit 230 updates information about the current connection status or operating status of the device stored in the status storage unit 235 with the detected connection status or operating status of the device. The process stays in step S610 until detection is performed by the detection unit 230.

Then, in response to detection of a change in the status by the detection unit 230, the selection unit 240 selects a resource access condition to be applied to the information processing apparatus 100 on the basis of the detected connection status or operating status of the device (step S650). Specifically, the selection unit 240 refers to the selection table 245, in which each of the combinations of the connection statuses or operating statuses of a plurality of devices is association with a resource access condition that should be applied to each of the combinations, and selects an access condition corresponding to the combination of the current connection statuses or operating statuses of individual devices read from the status storage unit 235. Then, the selection unit 240 stores the selected resource access condition in the condition storage unit 250 (step S660).

After step S660, the process goes back to step S610, and the aforementioned series of steps is repeated. Thus, an appropriate access condition that reflects the current operating environment or operating status of the information processing apparatus 100 is always stored in the condition storage unit 250.

Figure 7:
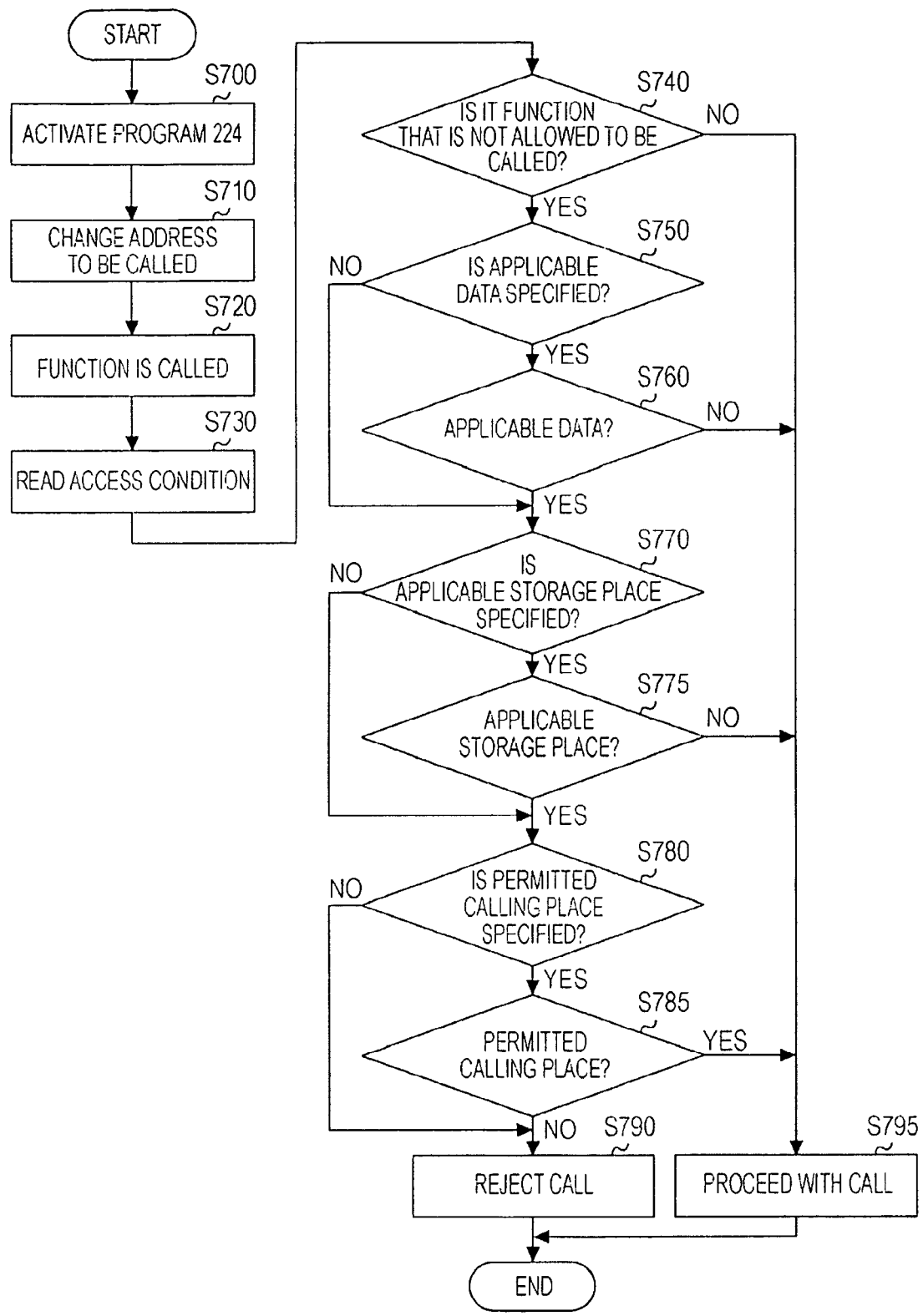
FIG. 7 is a flowchart showing an example in the flow of the process of a program 224.

FIG. 7 shows an example in the flow of a process in the information processing apparatus 100 caused to function as the capturing unit 270, the determination unit 260, and the control unit 265 by the program 224. At least, the program 224 needs to operate while the application programs 210, which may issue function calls for data access, are being activated, and need not necessarily be activated together with the OS 205, unlike the resident program 222. In this embodiment, the program 224, together with the application programs 210, which may issue function calls for data access, is activated.

In order to activate the program 224 and the application programs 210 at the same time, object files (for example, a DLL) of the program 224 including the capturing module, the determination module, and the control module are registered as a standard DLL of an operating system. For example, in Windows (a trademark), when these programs are registered in the registry as a USER32 extension DLL, these programs can be activated upon starting up all processes that link to USER32.DLL.

In step S700, the process is started upon activating the program 224. In response to the start of operation of the application programs 210, the capturing unit 270 captures a plurality of function calls for data access issued to the OS 205 by the application programs 210 by changing the called addresses to the address of the control module, which implements the control unit 265 (step S710).

More specifically, the capturing unit 270 backs up, in another area, leading instruction codes in parts of the DLLs #1 to #3 215, the parts being called from the application programs 210. Then, the capturing unit 270 replaces the instruction codes with a jump instruction to the control module, which implements the control unit 265. The capturing unit 270 further causes the control unit 265 to call the backed up leading instruction codes instead of calling the DLLs #1 to #3 215 from the control unit 265.

When a call has been received from the application programs 210 (step S720), the control unit 265 calls and causes the determination unit 260 to determine whether to allow a captured function call. In response to the call from the control unit 265, the determination unit 260 reads a resource access condition from the condition storage unit 250 (step S730). Then, the determination unit 260 first determines whether any function that is not allowed in the resource access condition matches a function called in the captured function call (step S740).

When the function called in the captured function call is not allowed in the resource access condition (step S740: YES), the determination unit 260 determines whether, in the resource access condition, function calls made for predetermined data are prohibited (step S750). When, in the resource access condition, function calls made for predetermined data are prohibited, the determination unit 260 determines whether the type of data specified by the argument of the captured function call corresponds to the predetermined data specified in the resource access condition (step S760).

When the captured function call is made for the predetermined data specified in the resource access condition (step S760: YES) or in the case of NO in step S750, the determination unit 260 further determines whether, in the resource access condition, function calls made specifying a predetermined storage place are prohibited (step S770). When, in the resource access condition, function calls made specifying a predetermined storage place are prohibited, the determination unit 260 determines whether a data storage place specified by the argument of the captured function call is the predetermined storage place specified in the resource access condition (step S775).

When the captured function call is made specifying the predetermined storage place specified in the resource access condition (step S775: YES) or in the case of NO in step S770, the determination unit 260 further determines whether, in the resource access condition, only processes that call functions and are invoked from a specific place are allowed to perform function call (step S780). When, in the access condition, only processes that call functions and are invoked from a specific place are allowed to perform function call, the determination unit 260 obtains the type, hardware identification information, and the like of a device in which a program module of a process that calls the function, and determines whether the device is the specific place, for activating processes, specified in the access condition (step S785).

When the place where the process, which calls the function, is invoked, is not the specific place, specified in the access condition (step S785: NO) or in the case of NO in step S780, the determination unit 260 returns the result of the determination that the captured function call is not allowed to the control unit 265. In response to the result of the determination, by the determination unit 260, that the captured function call is not allowed, the control unit 265 rejects the captured function call (step S790). On the other hand, in the case of NO in step S740, S760, or S775, or in the case of YES in step S785, the determination unit 260 returns the result of the determination that the captured function call is allowed to the control unit 265. In response to the result of the determination, by the determination unit 260, that the captured function call is allowed, the control unit 265 proceeds with the captured function call (step S795).

While the present invention has been described via the embodiment, the technical scope of the present invention is not limited to the scope described in the foregoing embodiment. It is apparent to those skilled in the art that various changes or improvements can be made in the foregoing embodiment. Thus, obviously, the embodiment that is changed or improved is also covered by the technical scope of the present invention.

What is claimed is:

1. A method, in an information processing apparatus, for controlling resource access by an application program running on the information processing apparatus, the method comprising:
    a step of detecting a change in connection statuses or operating statuses of a device connected to the information processing apparatus;
    a step of, in response to detection of the change in the connection statuses or the operating statuses, referring to a table in which each of the connection statuses or the operating statuses of the device is in association with a resource access condition that should be applied, and selecting a resource access condition to be applied to the information processing apparatus;
    a step of storing the selected resource access condition in a condition storage unit;
    a step of capturing a function call for resource access issued to an operating system by the application program;
    a step of determining whether to allow the captured function call on the basis of the resource access condition read from the condition storage unit; and
    a step of rejecting the function call in response to determination not to allow the function call.

2. The method according to claim 1, wherein the device is any one of a network device, an external display, and an external medium.

3. The method according to claim 1, wherein the detecting step comprises a step of detecting a change in an operating status of a network device,
    wherein on condition that a wireless network device is ready for use, the selecting step includes a step of selecting a resource access condition that is stricter than a resource access condition for a case where a wired network device is ready for use.

4. The method according to claim 1, wherein the detecting step comprises a step of, upon detecting that a network device is ready for use, obtaining a type of a network to which the information processing apparatus is connected, the type showing a safety level of the network,
    wherein on condition that the network device is ready for use and that the type of the network does not indicate a secure network, the selecting step includes a step of selecting a resource access condition that is stricter than a resource access condition for a case where the network device is ready for use and the type of the network indicates a secure network.

5. The method according to claim 1, wherein the detecting step comprises a step of detecting a change in a connection status of an external display,
    wherein on condition that the external display is connected, the selecting step includes a step of selecting a resource access condition for rejecting a function call to browse predetermined data.

6. The method according to claim 1, wherein the detecting step comprises a step of detecting a change in a connection status or an operating status of an external medium,
    wherein on condition that the external medium is connected or ready for use, the selecting step includes a step of selecting a resource access condition for causing a process invoked from the external medium and another process to access resources under different conditions.

7. The method according to claim 1, wherein the detecting step comprises a step of, upon detecting that an external medium is connected or ready for use, obtaining hardware identification information of the external medium, wherein on condition that the external medium is connected or ready for use, the selecting step includes a step of selecting a resource access condition to be applied to the information processing apparatus on the basis of the hardware identification information of the external medium.

8. The method according to claim 1, further comprising a step of, in response to detection of the changes in the connection statuses or the operating statuses of a plurality of devices, storing the detected connection statuses or operating statuses of the plurality of devices in a status storage unit, wherein, in the table, each of combinations of connection statuses or operating statuses of the plurality of devices is in association with a resource access condition that should be applied, wherein the selecting step includes a step of reading the current connection statuses or operating statuses of the individual devices from the status storage unit, referring to the table, and selecting a resource access condition to be applied to the information processing apparatus.

9. An information processing apparatus for controlling resource access by an application program, the information processing apparatus comprising:

a detection unit for detecting a change in connection statuses or operating statuses of a device connected to the information processing apparatus;

a selection unit for, in response to detection of the change in the connection statuses or the operating statuses, referring to a table in which each of the connection statuses or the operating statuses of the device is in association with a resource access condition that should be applied, and selecting a resource access condition to be applied to the information processing apparatus;

a condition storage unit for storing the selected resource access condition;

a capturing unit for capturing a function call for resource access issued to an operating system by the application program;

a determination unit for determining whether to allow the captured function call on the basis of the resource access condition read from the condition storage unit; and a control unit for rejecting the function call in response to determination not to allow the function call.

10. A program product for controlling resource access by an application program running on an information processing apparatus, the program product, comprising a non-transitory computer readable medium having computer usable program code embodied therewith, causing the information processing apparatus to execute:

a step of detecting a change in connection statuses or operating statuses of a device connected to the information processing apparatus;

a step of, in response to detection of the change in the connection statuses or the operating statuses, referring to a table in which each of the connection statuses or the operating statuses of the device is in association with a resource access condition that should be applied, and selecting a resource access condition to be applied to the information processing apparatus;

a step of storing the selected resource access condition in a condition storage unit;

a step of capturing a function call for resource access issued to an operating system by the application program;

a step of determining whether to allow the captured function call on the basis of the resource access condition read from the condition storage unit; and a step of rejecting the function call in response to determination not to allow the function call.

* * * * *